(12) United States Patent  (10) Patent No.: US 9,371,845 B2
Japelt et al.  (45) Date of Patent: Jun. 21, 2016

(54) BRAKE OR COUPLING SYSTEM AND METHOD OF OPERATING SUCH SYSTEM

(75) Inventors: Jakob Bak Japelt, Copenhagen (DK); Lars Peter Eriksen, Svendborg (DK); Poul Sejer Nielsen, Odense (DK)

(73) Assignee: S.B. Patent Holding ApS, Vejstrup (DK)

( * ) Notice: Subject to any disclaimer, the term of this patent is extended or adjusted under 35 U.S.C. 154(b) by 399 days.

(21) Appl. No.: 14/005,617

(22) PCT Filed: Mar. 19, 2012

(86) PCT No.: PCT/EP2012/054778
§ 371 (c)(1),
(2), (4) Date: Sep. 17, 2013

(87) PCT Pub. No.: WO2012/126877
PCT Pub. Date: Sep. 27, 2012

(65) Prior Publication Data
US 2014/0013732 A1  Jan. 16, 2014

(30) Foreign Application Priority Data

Mar. 18, 2011 (EP) ..................... 11158880

(51) Int. Cl.
*F16D 55/18* (2006.01)
*F15B 15/00* (2006.01)
*F16D 65/74* (2006.01)
*F16D 127/02* (2012.01)
*F16D 129/02* (2012.01)

(52) U.S. Cl.
CPC ............... *F15B 15/00* (2013.01); *F16D 65/74* (2013.01); *F16D 2127/02* (2013.01); *F16D 2129/02* (2013.01)

(58) Field of Classification Search
CPC ......... B60T 7/02; B60T 11/10; F16D 55/226; F16D 65/18; B66D 5/14
USPC ................. 188/72.4, 72.6, 151 R, 170, 353
See application file for complete search history.

(56) References Cited

U.S. PATENT DOCUMENTS 3,125,187 A   3/1964  Dotto
3,547,233 A * 12/1970  Girvan ...................... B60T 7/02
                                            188/106 P (Continued)

FOREIGN PATENT DOCUMENTS

DE    1269426 B    5/1968
EP    0413112 A1   2/1991

*Primary Examiner* — Christopher Schwartz
(74) *Attorney, Agent, or Firm* — Reising Ethington P.C.

(57) ABSTRACT

The brake or coupling system (1) comprises a first piston (2) arranged in a first piston cylinder (3) thereby forming a first piston chamber (5) and a second piston (8) arranged in a second piston cylinder (9) thereby forming a second piston chamber (10). The first piston (2) is adapted to be displaced between a braking position and a rest position. The first piston (2) is spring biased in the direction of its rest position, and the second piston (8) is adapted to adjust a distance (X) provided between a friction element (6) and a rotatable element (7) in the rest position of the first piston (2) by means of adjustment of a volume of hydraulic fluid trapped in the second piston chamber (10). At least one spring element is arranged to act between the first and second pistons (2, 8). The first and second pistons (2, 8) are so arranged that a hydraulic pressure in the first and second piston chambers (5, 10), respectively, will urge the first and second pistons (2, 8) in opposite directions, thereby biasing the at least one spring element.

20 Claims, 6 Drawing Sheets

(56) References Cited

U.S. PATENT DOCUMENTS

| | | | | |
|---|---|---|---|---|
| 3,613,839 A | * | 10/1971 | MacDuff | B60T 11/10 188/160 |
| 3,669,226 A | * | 6/1972 | Marschall | F16D 55/226 188/151 A |
| 4,638,894 A | * | 1/1987 | Sitabkhan | B66D 5/14 188/170 |
| 5,485,902 A | | 1/1996 | Berwanger | |
| 6,920,964 B1 | * | 7/2005 | Mackiewicz | F16D 65/18 188/262 |
| 7,434,669 B2 | * | 10/2008 | Halasy-Wimmer | F16D 65/18 188/158 |

\* cited by examiner

BRAKE OR COUPLING SYSTEM AND METHOD OF OPERATING SUCH SYSTEM

This is a National Phase Application filed under 35 U.S.C. 371 as a national stage of PCT/EP2012/054778, filed Mar. 19, 2012, and claims priority from European Application No. 11158880.2, filed Mar. 18, 2011, the content of each of which is hereby incorporated by reference in its entirety.

TECHNICAL FIELD

The present invention relates to a brake or coupling system comprising a first piston arranged displaceably in a first piston cylinder thereby forming a first piston chamber and a second piston arranged displaceably in a second piston cylinder thereby forming a second piston chamber, the first piston being adapted to be displaced between a braking position, in which braking force is applied between a friction element and a rotatable element, and a rest position, in which the friction element is spaced from the rotatable element, the first piston being spring biased in the direction of its rest position by means of at least one spring element, and the second piston being adapted to adjust a distance provided between the friction element and the rotatable element in the rest position of the first piston by means of adjustment of a volume of hydraulic fluid trapped in the second piston chamber.

BACKGROUND ART

U.S. Pat. No. 5,485,902 describes a hydraulic brake piston adjuster assembly adapted to automatically adjust the clearance between the brake lining and brake disc as the lining is worn. A first piston is displaceable in a housing, and a second piston is displaceable coaxially in the first piston in a second piston chamber. During braking, the first piston is displaced in the direction of the brake disc, whereby a set of disc springs is compressed fully until an abutment is reached. Thereby, the piston cap of the second piston compresses the brake stack. If the brake stack has been worn, the second piston will be displaced relative to the first piston until abutment of the piston cap, as hydraulic fluid is allowed to enter the second piston chamber through a relief valve. Thereby, the position of the piston cap is adjusted according to wear of the brake lining, and, when releasing the brake, the piston cap will be retracted a certain distance by means of the disc springs. However, it may be complicated to retract the second piston into the first piston in order to gain the space necessary for a replacement of the brake lining, as the relief valve positioned centrally within the second piston will have to be opened, and an adequate force must be applied possibly manually to the piston cap of the second piston in order to retract the second piston into the first piston.

EP 0 413 112 A1 describes a hydraulic brake with automatic slack adjustment. The rest position of a main brake piston is adjusted by means of an auxiliary piston. The auxiliary piston is advanced as wear takes place and is retained in its position entirely by means of friction rings. Furthermore, with increasing wear of a brake lining, an increasing volume of hydraulic oil is trapped behind the auxiliary piston in the rest position of the main brake piston with the only aim of withstanding sudden impacts on the main brake piston. However, the use of friction rings may not provide a sufficient accurate adjustment of the rest position of a main brake piston. Furthermore, it may be complicated to retract the main brake piston in order to replace the brake lining, as the brake may have to be completely disassembled in order to release the friction rings.

DISCLOSURE OF THE INVENTION

The object of the present invention is to provide a brake or coupling system adapted to adjust the clearance between a friction element and a rotatable element in a rest position, whereby replacement of the brake lining is facilitated.

In view of this object, the at least one spring element is arranged to act between the first and second pistons, and the first and second pistons are so arranged that a hydraulic pressure in the first and second piston chambers, respectively, will urge the first and second pistons in opposite directions, thereby biasing the at least one spring element.

Thereby, as the rest position of the first piston may be defined by the position of the second piston, an increasing wear of the friction element may be compensated for by a decreasing volume of hydraulic fluid trapped in the second piston chamber. Therefore, when the friction element has been fully worn, it may easily be retracted a suitably distance from the rotatable element by simply supplying hydraulic fluid to the second piston chamber. Thereby, the space necessary for a replacement of the friction element may be obtained simply by pushing a button.

In an embodiment, the effective piston area of the second piston is smaller than the effective piston area of the first piston. Thereby, an equal hydraulic pressure may be supplied to both the first and the second piston chamber when braking force is to be applied, as the first piston will outbalance the second piston so that the resulting force will displace the first piston to its braking position. Thereby, the brake or coupling system may be simplified, as a possible pressure reduction valve will not be necessary for the supply of hydraulic fluid to the second piston chamber.

In an embodiment, the relative movement between the first piston and the second piston is limited by means of a first end stop defining a first distance between the first and second pistons and a second end stop defining a second distance between the first and second pistons. Thereby, a more accurate adjustment of the distance provided between the friction element and the rotatable element in the rest position of the first piston may be obtained, as the possible relative displacement between the first and the second piston is well defined.

In a structurally advantageous embodiment, the first and second piston cylinders are both formed in a stationary housing of the brake or coupling system. Thereby, the design of the brake or coupling system may be simplified.

In a structurally advantageous embodiment, the first and second pistons are connected by means of a piston rod, and the first piston is arranged at a first end of the piston rod, and the second piston is arranged at a second end of the piston rod. Thereby, the design of the brake or coupling system may be simplified. The friction element may be positioned more or less directly on the first piston, as the second piston may be positioned opposite the rotatable element in relation to the first piston.

The first piston and/or the second piston may be arranged displaceably in relation to the piston rod in an axial direction of the piston rod. In one embodiment, the second piston is fixed to the piston rod, and the first piston is arranged displaceably in relation to the piston rod.

In an embodiment, the least one spring element is arranged in an internal bore of the first piston and acts between the first piston and the first end of the piston rod. This may especially be of advantage in the case that the effective piston area of the second piston is smaller than the effective piston area of the first piston, as more space may be provided within the first piston.

However, the least one spring element may just as well be arranged between the second piston and the second end of the piston rod.

In a structurally advantageous embodiment, the least one spring element has the form of a stack of disc springs arranged around the first end of the piston rod.

In an embodiment, the first end stop defining the first distance between the first and second pistons is formed by means of an end face of the first end of the piston rod and a bottom face of the internal bore of the first piston.

In an embodiment, the second end stop defining the second distance between the first and second pistons is formed by means of a first end face of a bushing arranged around the first end of the piston rod and a shoulder of the first end of the piston rod, and a second end face of said bushing abuts a stop element arranged in the internal bore of the first piston.

In an embodiment, the first and second piston chambers are connected to a supply of hydraulic fluid via a valve system adapted to, during application of braking force, supply hydraulic fluid to the first piston chamber and allow leak of hydraulic fluid from the second piston chamber and to, during release of braking force, allow hydraulic fluid to be drained from the first piston chamber and close fluid connection to the second piston chamber so that a volume of hydraulic fluid is trapped in the second piston chamber. Thereby, an increasing wear of the friction element may automatically be compensated for by a decreasing volume of hydraulic fluid trapped in the second piston chamber.

In a structurally advantageous embodiment, the valve system includes a check valve provided with a first, a second and a third valve port, the check valve includes a valve element that is spring biased against a valve seat to normally prevent flow from the first valve port to the second valve port and to normally allow flow from the second valve port to the first valve port when a certain pressure drop occurs from the second valve port to the first valve port, the check valve includes a pilot piston arranged to be displaced by a hydraulic pressure applied to the third valve port so that the pilot piston engages the valve element and brings it to its open position, the first valve port is in fluid communication with the second piston chamber, and the second and third valve ports are in fluid communication with a first hydraulic fluid supply line connecting the first piston chamber with a first brake inlet port. Thereby, by means of a single check valve, an increasing wear of the friction element may automatically be compensated for by a decreasing volume of hydraulic fluid trapped in the second piston chamber. Pressurized hydraulic fluid may simply be supplied to the first brake inlet port, when braking force is to be applied, and the first brake inlet port may be connected to a drain, when braking force is to be released.

In an embodiment, the first valve port is in fluid communication with the second piston chamber via a possibly adjustable flow restriction. Thereby, the response of the second piston during the release of braking force may be regulated by the employment of a suitable flow restriction and possible fine-tuned in the case of an adjustable flow restriction. Thereby, during the release of braking force, it may be avoided that the second piston starts to move before the check valve closes in order to lock the second piston in its actual position. Thereby, possibly a more accurate adjustment of the distance provided between the friction element and the rotatable element in the rest position of the first piston may be obtained.

In an embodiment, the second piston chamber is by means of a second hydraulic fluid supply line connected directly with a second brake inlet port. Thereby, when the friction element has been worn, it may easily be retracted a suitably distance from the rotatable element by simply supplying hydraulic fluid to the second brake inlet port whereby it will reach the second piston chamber via the second hydraulic fluid supply line.

In another embodiment, the valve system comprises a first electronically operated valve connecting the first piston chamber with the supply of hydraulic fluid and a second electronically operated valve connecting the second piston chamber with the supply of hydraulic fluid, and the first and second electronically operated valves are controlled by means of a control system, such as a computer control system. Thereby, by controlling the first and second electronically operated valves accordingly, an increasing wear of the friction element may automatically be compensated for by a decreasing volume of hydraulic fluid trapped in the second piston chamber.

In yet another embodiment, the first piston chamber is in fluid communication with a first hydraulic fluid supply line, and a valve system is connected between the first piston chamber and the second piston chamber, wherein the valve system is adapted to open a fluid connection between the first piston chamber and the second piston chamber, when pressure force is applied and hydraulic fluid is supplied to the first piston chamber via the first hydraulic supply line, and adapted to close the fluid connection between the first piston chamber and the second piston chamber, when braking force is released. The valve system may be implemented into the piston rod. Thereby, a particular simple solution for the braking system is provided. Advantageously, the valve system comprises a pilot valve.

According to another embodiment, a relief is connected to the second piston chamber, thereby preventing that an over pressure is built up in the second piston chamber which could provide a violent retraction of the brake.

The present invention further relates to a method of operating a brake or coupling system, the system comprising a first piston arranged displaceably in a first piston cylinder thereby forming a first piston chamber and a second piston arranged displaceably in a second piston cylinder thereby forming a second piston chamber, the method comprising the following steps:

in order to apply a braking force between a friction element and a rotatable element, displacing the first piston from a rest position to a braking position by supplying hydraulic fluid to the first piston chamber, thereby biasing at least one spring element, in order to release said braking force between the friction element and the rotatable element, displacing the first piston from the braking position to the rest position by allowing hydraulic fluid to leave the first piston chamber, thereby at least partially unbiasing the at least one spring element, in order to adjust a distance provided between the friction element and the rotatable element in the rest position of the first piston, adjusting a volume of hydraulic fluid trapped in the second piston chamber.

The method is characterized by that the at least one spring element is acting between the first and second pistons, and by that, during application of said braking force, a hydraulic pressure in the first and second piston chambers, respectively, urge the first and second pistons in opposite directions, thereby biasing the at least one spring element. Thereby, the above-mentioned properties may be obtained.

BRIEF DESCRIPTION OF THE DRAWINGS

The invention will now be explained in more detail below by means of examples of embodiments with reference to the very schematic drawing, in which.

DETAILED DESCRIPTION OF THE INVENTION

Figure 1:
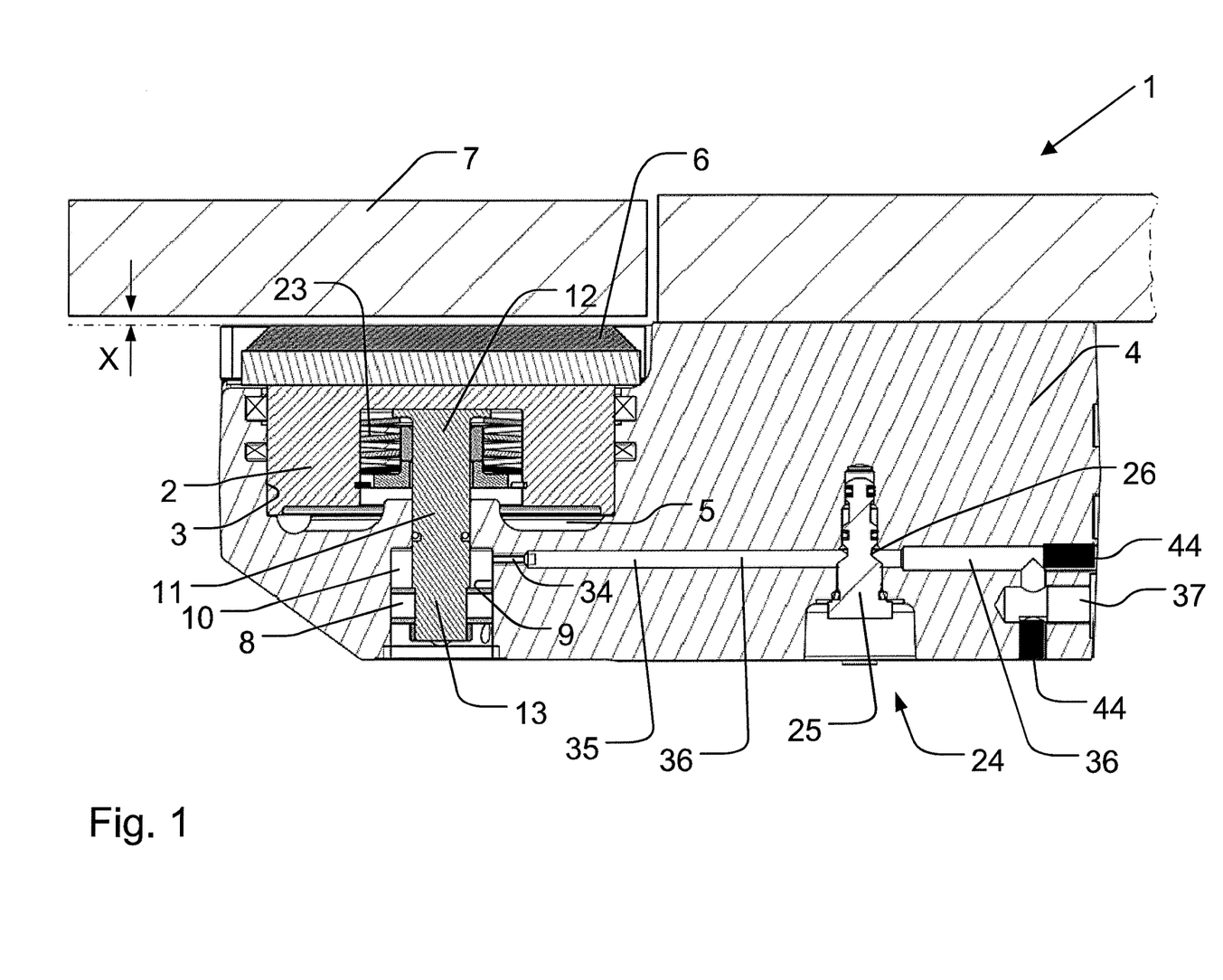
FIG. 1 is a cross-section along the line I-I of FIG. 4 through part of a brake system according to the invention, whereby a first piston is in its rest position.
Figure 2:
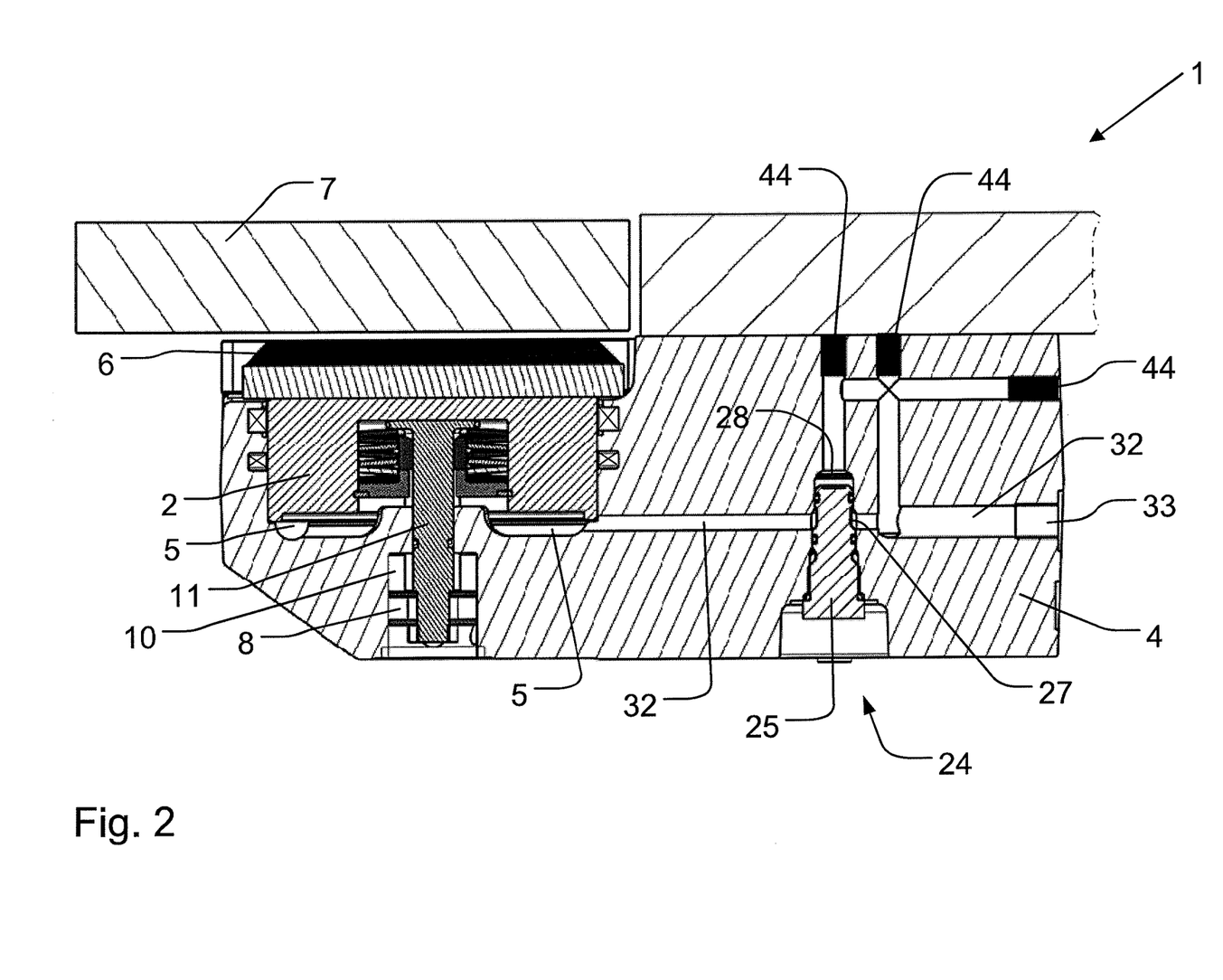
FIG. 2 is a cross-section along the line II-II of FIG. 4 through part of the brake system, whereby the first piston is in its rest position.
Figure 3:
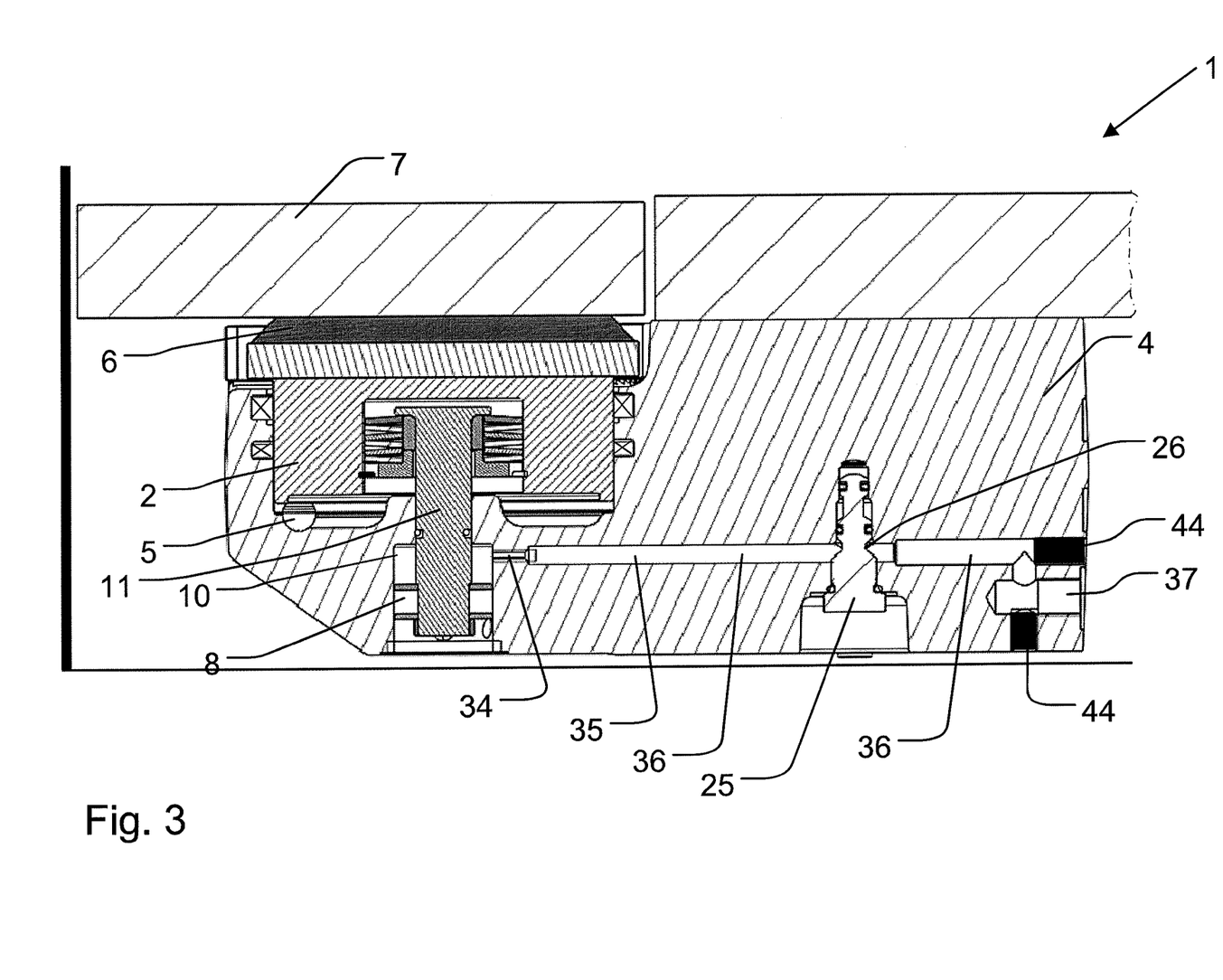
FIG. 3 is a cross-section corresponding to that of FIG. 1, however, whereby the first piston is in its braking position.

FIG. 1 illustrates the invention by means of a brake system 1. The illustrated brake system 1 is suitable to stop or brake the rotor of a wind turbine; however, the invention is equally applicable to other kinds of brake systems and coupling systems. In the following, directions such as up and down, left and right refers to the brake system 1 as it is illustrated in FIGS. 1 to 3.

The brake system 1 according to the invention is a so-called active brake whereby, in order to brake, an action has to be taken, and that is, hydraulic pressure has to be applied. Normally, a brake includes two callipers, each including a friction lining, one calliper on each side of a rotatable element, such as a disc, and these clamp in on the disc at the same time. In a dual-spring brake system, each calliper includes a return spring. If the brake for example is to be mounted directly on a gearbox and/or on a system with a possibility for axial movement of the rotatable element, a mono-spring brake may be applied. The mono-spring brake system includes a brake calliper and a so-called holding calliper that are both mounted displaceably on an axis, which means that they can move and adjust if the position of the disc changes. The invention is equally applicable to dual-spring and mono-spring brake systems.

The shown brake system 1 comprises a first piston 2 arranged displaceably in a first piston cylinder 3 formed in a stationary housing 4 of the brake system, thereby forming a first piston chamber 5 below the first piston 2. On the top of the first piston 2 is arranged a friction element 6 in the form of a friction lining adapted to engage a rotatable element 7 arranged above the friction element 6. The first piston 2 is adapted to be displaced between a braking position, as shown in FIG. 3, in which the friction element 6 engages the rotatable element 7 and braking force thereby is applied between the friction element 6 and the rotatable element 7, and a rest position, as shown in FIGS. 1 and 2, in which the friction element 6 is spaced from the rotatable element 7. Thereby, a certain required distance X is provided between the friction element 6 and the rotatable element 7 as indicated in FIG. 1.

Furthermore, brake system 1 comprises a second piston 8 arranged displaceably in a second piston cylinder 9 formed in the stationary housing 4 of the brake system, thereby forming a second piston chamber 10 above the second piston 8. The second piston 8 is arranged below the first piston 2 concentrically therewith and is connected with the first piston 2 by means of a piston rod 11, whereby the second piston 8 is adapted to adjust the distance X provided between the friction element 6 and the rotatable element 7 in the rest position of the first piston 2 by means of adjustment of a volume of hydraulic fluid trapped in the second piston chamber 10. The first piston 2 is arranged at a first end 12 of the piston rod 11, and the second piston 8 is arranged at a second end 13 of the piston rod 11.

The first piston 2 is sealed against the first piston cylinder 3 by means of conventional sealing rings 38. The piston rod 11 is sealed against a bore in the stationary housing 4 connecting the first and the second piston chambers 5, 10 by means of a conventional sealing ring 39, such as an O-ring. The second piston 8 is sealed against the second piston cylinder 9 by means of a rubber sealing disc 40 compressed between two metal discs 41 in that the upper metal disc 41 abuts a shoulder 42 of the piston rod 11 and the lower metal disc 41 abuts a nut 43 screwed onto an end thread of the piston rod 11. By this configuration, an easy assembly of the first and second pistons 2, 8 in the stationary housing 4 may be obtained by first inserting the first piston in the housing from above and then inserting the second piston from below and then mounting the nut 43.

However, the first and second pistons 2, 8 and the piston rod 11 may be sealed in their respective bores by any suitable sealing rings.

In the embodiment shown, the second piston 8 is fixed to the piston rod 11, and the first piston 2 is arranged displaceably in relation to the piston rod 11 in the axial direction of the piston rod 11. The second end 13 of the piston rod 11 is arranged in an internal bore 14 of the first piston 2. The relative displacement of the first piston 2 in relation to the piston rod 11 and therefore the relative movement between the first piston 2 and the second piston 8 is limited to the above-mentioned required distance X by means of a first end stop defining a first distance between the first and second pistons 2, 8 and a second end stop defining a second distance between the first and second pistons 2, 8.

Figure 1A:
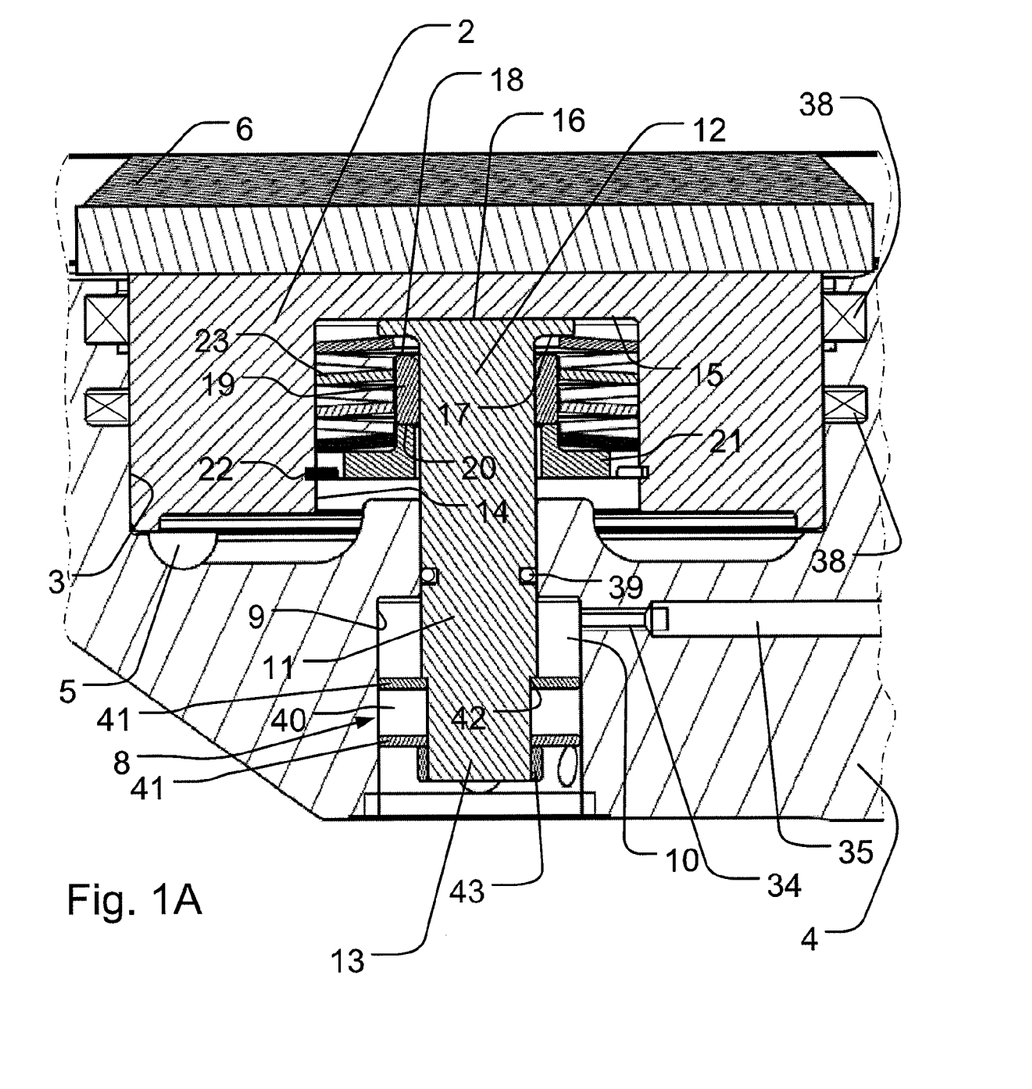
FIG. 1A shows part of FIG. 1 on a larger scale.

The first end stop defining the first distance between the first and second pistons 2, 8 is formed by means of an end face 16 of the first end 12 of the piston rod 11 and a bottom face 15 of the internal bore 14 of the first piston 2. The second end stop defining the second distance between the first and second pistons 2, 8 is formed by means of a first end face 18 of a bushing 19 arranged around the first end 12 of the piston rod 11 and a shoulder 17 of the first end 12 of the piston rod 11. A second end face 20 of said bushing abuts a stop element 21 arranged in the internal bore of the first piston 2 and fixed in the internal bore 14 by means of a locking ring 22.

A spring element in the form of a stack of disc springs 23 is arranged around the first end 12 of the piston rod 11 in the internal bore 14 of the first piston 2 and acts between the first piston 2 and the first end 12 of the piston rod 11 and thereby between the first and second pistons 2, 8. The upper end of the stack of disc springs 23 abuts the shoulder 17 of the first end 12 of the piston rod 11, and the lower end of the stack of disc springs 23 abuts the stop element 21 arranged in the internal bore of the first piston 2. Looking at FIGS. 1 to 3, it is realized that the first piston 2 thereby is spring biased in the direction of its rest position by means of the stack of disc springs 23. It is noted that although a different number of disc springs 23 is shown in different figures, this is only due to difficulties drawing the disc springs 23 in their compressed state; of course, the brake system 1 will in reality comprise the same number of disc springs in all states of operation.

Furthermore, it is noted that the first and second pistons 2, 8 are so arranged that a hydraulic pressure in the first and second piston chambers 5, 10, respectively, will urge the first and second pistons in opposite directions, thereby biasing the at least one spring element in the form of the stack of disc springs 23. In addition, it is noted that the effective piston area of the second piston 8 is smaller than the effective piston area of the first piston 2. Thereby it may be obtained that an equal hydraulic pressure may be supplied to both the first piston chamber 5 and the second piston chamber 10 when braking force is to be applied, as the first piston 2 will then outbalance the second piston 8 so that the resulting force will displace the first piston 2 upwards to its braking position as shown in FIG. 3.

The first and second piston chambers 5, 10 are connected to a (not shown) supply of hydraulic fluid via a valve system 24 adapted to, during application of braking force, supply hydraulic fluid to the first piston chamber 5 and allow leak of hydraulic fluid from the second piston chamber 10 and to, during release of braking force, allow hydraulic fluid to be drained from the first piston chamber 5 and close fluid connection to the second piston chamber 10 so that a volume of hydraulic fluid is trapped in the second piston chamber 10.

Figure 5:
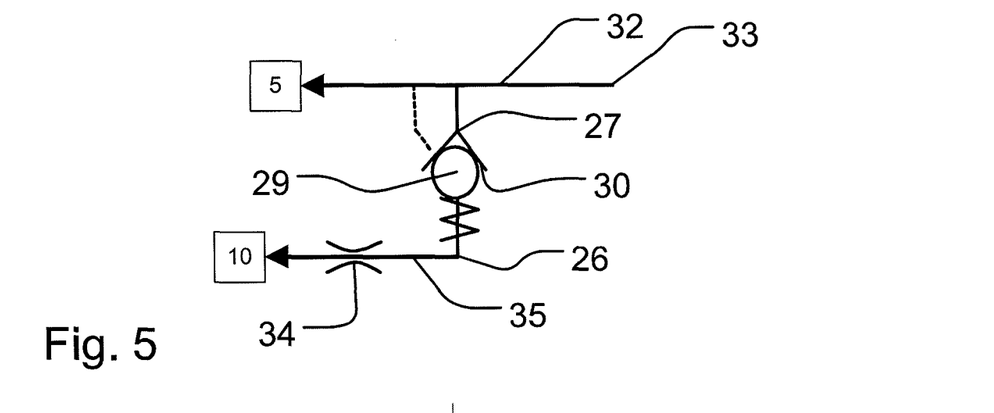
FIG. 5 is a diagram illustrating possible valve connections for the brake system.
Figure 6:
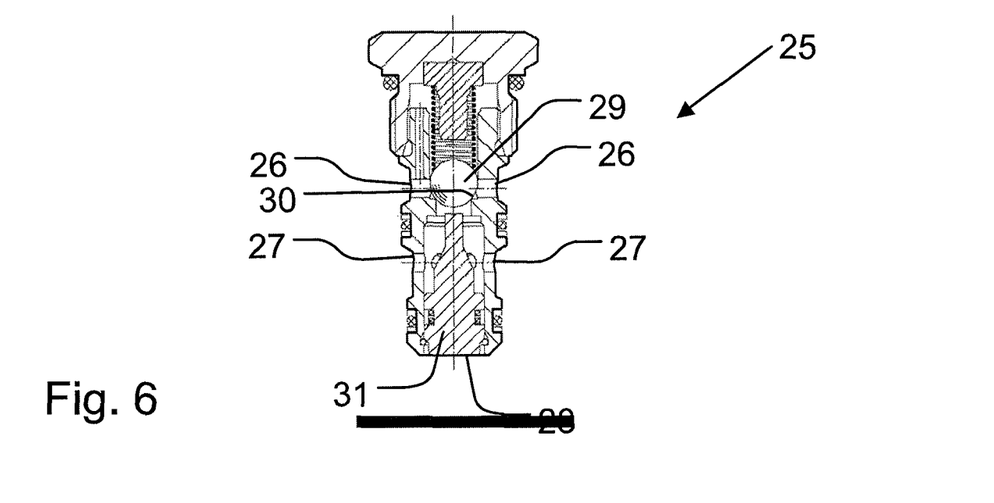
FIG. 6 is a cross-section through an embodiment of a check valve suitable for the brake system.

In the embodiment shown, the valve system 24 includes a check valve 25 provided with a first valve port 26 (see FIGS. 1, 3, 5 and 6), a second valve port 27 (see FIGS. 2, 5 and 6) and a third valve port 28 (see FIGS. 2, 5 and 6). The check valve 25 includes a valve element 29 in the form of a ball that is spring biased against a valve seat 30 to normally prevent flow from the first valve port 26 to the second valve port 27 and to normally allow flow from the second valve port 27 to the first valve port 26 when a certain pressure drop occurs from the second valve port 27 to the first valve port 26, see FIGS. 5 and 6. Furthermore, the check valve 25 includes a pilot piston 31 arranged to be displaced by a hydraulic pressure applied to the third valve port 28 so that the pilot piston 31 engages the valve element 29 and brings it to its open position.

The check valve 25 may, for instance, be supplied by Sterling Hydraulics, for instance of the type D02D3, and be configured to operate as described in the following. The spring-loaded valve element 29 in the form of a ball is shifted by low pressure on the second valve port 27 allowing free flow to the first valve port 26. The pilot piston 31 is shifted by a pilot pressure on the third valve port 28 and acts to shift the spring-loaded ball allowing flow from the first valve port 26 to the second valve port 27. Reverse flow, from the first valve port 26 to the second valve port 27, is blocked when pressure on the first valve port 26 is, as an example, about three times greater than the pilot pressure on the third valve port 28. Back pressure on the second valve port 27 and, as an example, a third of the pressure drop, the first and second valve ports 26, 27 each add to the pilot pressure required on the third valve port 28.

As seen in FIGS. 1 and 3, the first valve port 26 is in fluid communication with the second piston chamber 10. As seen in FIG. 2, the second and third valve ports 27, 28 are in fluid communication with a first hydraulic fluid supply line 32 connecting the first piston chamber 5 with a first brake inlet port 33. In order to bring the first piston 2 to its braking position shown in FIG. 3, the first brake inlet port 33 is supplied with hydraulic fluid from the above-mentioned (not shown) supply of hydraulic fluid. A not shown solenoid valve or the like may open for the supply of hydraulic fluid.

In the embodiment shown, the first valve port 26 is in fluid communication with the second piston chamber 10 via a flow restriction 34 in the form of a narrow passage that may be provided in a separate plug inserted into a channel 35 connecting the first valve port 26 and the second piston chamber 10. The flow restriction 34 may alternatively be in the form of an adjustable restriction, for instance a flow reduction valve or a restricted aperture of variable cross-section. By means of the flow restriction 34, during the release of braking force, it may be avoided that the second piston 8 starts to move before the check valve 25 closes in order to lock the second piston 8 in its actual position. Thereby, possibly a more accurate adjustment of the distance provided between the friction element 6 and the rotatable element 7 in the rest position of the first piston 2 may be obtained.

As seen in FIGS. 1 and 3, the second piston chamber 10 is by means of a second hydraulic fluid supply line 36 including the above-mentioned channel 35 connected directly with a second brake inlet port 37. Thereby, when the friction element 6 has been worn, it may easily be retracted a suitably distance from the rotatable element 7 by simply supplying hydraulic fluid to the second brake inlet port 37 whereby it will reach the second piston chamber 10 via the second hydraulic fluid supply line 36.

Figure 4:
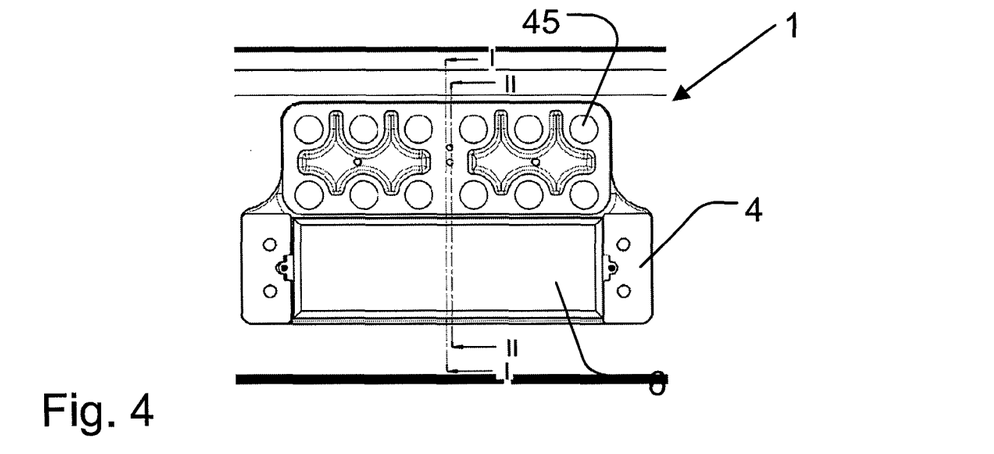
FIG. 4 is a top view of the brake system according to the invention.

In the figures, it is seen that some channel ends are closed by means of plugs 44 in order to obtain the desired channel configurations. In FIG. 4, it is apparent that the stationary housing 4 of the brake system 1 is provided with bores 45 for mounting bolts.

In an alternative, not shown embodiment, the valve system 24 comprises a first electronically operated valve connecting the first piston chamber 2 with the supply of hydraulic fluid and a second electronically operated valve connecting the second piston chamber 10 with the supply of hydraulic fluid, and the first and second electronically operated valves are controlled by means of a control system, such as a computer control system. The first and second electronically operated valves may for instance be solenoid valves or the like.

Independently of how the valve system 24 is configured, for instance by means of mechanically or electronically controlled valves, the brake or coupling system according to the invention may be operated as follows.

In order to apply a braking force between the friction element 6 and the rotatable element 7, the first piston 2 is displaced from a rest position to a braking position by supplying hydraulic fluid to the first piston chamber 5. At the same time, a hydraulic pressure is supplied to the second piston chamber 10 so that a hydraulic pressure in the first and second piston chambers 5, 10, respectively, urge the first and second pistons 2, 8 in opposite directions, thereby biasing the at least one spring element in the form of the stack of disc springs 23 acting between the first and second pistons until abutment of the above-mentioned first end stop. Because the effective piston area of the second piston 8 is smaller than the effective piston area of the first piston 2, the resulting force on the first and second pistons will displace the first piston 2 upwards so that the friction element 6 engages the rotatable element 7.

In order to release said braking force between the friction element 6 and the rotatable element 7, the first piston 2 is displaced from the braking position to the rest position by allowing hydraulic fluid to leave the first piston chamber 5, thereby at least partially unbiasing the stack of disc springs 23 until abutment of the above-mentioned second end stop. At the same time, in order to adjust the distance provided between the friction element 6 and the rotatable element 7 in the rest position of the first piston 2, the volume of hydraulic fluid now present in the second piston chamber 10 is trapped in the chamber by closing the channel 35 leading to the second piston chamber 10.

Figure 7:
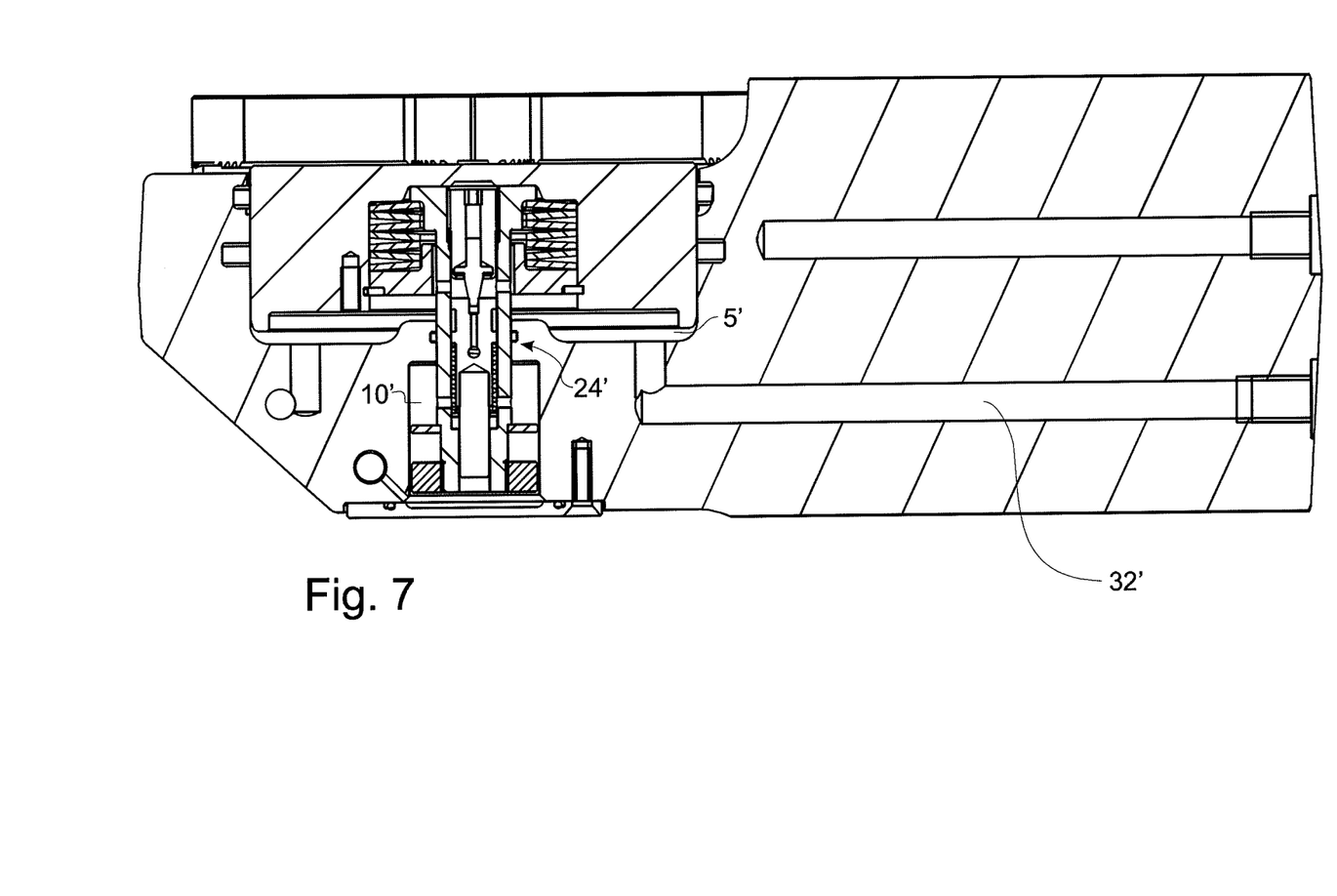
FIG. 7 is a cross-section of another embodiment brake system according to the invention.

FIG. 7 is a cross-section of another embodiment brake system according to the invention. This embodiment differs from the embodiment shown in FIGS. 1-3 in that the valve system 24' is integrated into the rod piston. The valve system 24' comprises a pilot valve. In order to bring the first piston to its braking position, the first piston chamber 5' is supplied with hydraulic fluid via the first hydraulic supply line 32'. Thereby, hydraulic fluid is also supplied to the pilot valve via first valve ports. This forces an internal piston down in order to open up second valve ports in fluid connection with the second piston chamber 10' and at the same time biases an internal spring connected to said piston. Thus, a fluid connection between the first piston chamber 5' and the second piston chamber 10' is opened. Once the braking force is released and hydraulic fluid is allowed to drain from the first piston chamber 5', the internal spring and the piston of the pilot valve retract and close the fluid connection between the first valve ports and the second valve ports, thus closing the fluid connection between the first piston chamber 5' and the second piston chamber 10' and accordingly trapping the hydraulic fluid in the second piston chamber 10'.

The invention claimed is:

1. A brake or coupling system (1) comprising a first piston (2) arranged displaceably in a first piston cylinder (3) thereby forming a first piston chamber (5) and a second piston (8) arranged displaceably in a second piston cylinder (9) thereby forming a second piston chamber (10), the first piston (2) being adapted to be displaced between a braking position, in which braking force is applied between a friction element (6) and a rotatable element (7), and a rest position, in which the friction element (6) is spaced from the rotatable element (7), the first piston (2) being spring biased in the direction of its rest position by means of at least one spring element, and the second piston (8) being adapted to adjust a distance (X) provided between the friction element (6) and the rotatable element (7) in the rest position of the first piston (2) by means of adjustment of a volume of hydraulic fluid trapped in the second piston chamber (10), characterized in that the at least one spring element is arranged to act between the first and second pistons (2, 8), and in that the first and second pistons (2, 8) are so arranged that a hydraulic pressure in the first and second piston chambers (5, 10), respectively, will urge the first and second pistons (2, 8) in opposite directions, thereby biasing the at least one spring element
wherein the first and second pistons (2, 8) are connected by means of a piston rod (11), and wherein the first piston (2) is arranged at a first end (12) of the piston rod (11), and the second piston (8) is arranged at a second end (13) of the piston rod (11)
wherein a valve system (24') is implemented into the piston rod (11).

2. A brake or coupling system according to claim 1, wherein the least one spring element is arranged in an internal bore (14) of the first piston (2) and acts between the first piston (2) and the first end (12) of the piston rod (11).

3. A brake or coupling system according to claim 2, wherein the least one spring element has the form of a stack of disc springs (23) arranged around the first end (12) of the piston rod (11).

4. A brake or coupling system according to claim 2, wherein the first end stop defining the first distance between the first and second pistons (2, 8) is formed by means of an end face (16) of the first end (12) of the piston rod (11) and a bottom face (15) of the internal bore (14) of the first piston (2).

5. A brake or coupling system according to claim 2, wherein the second end stop defining the second distance between the first and second pistons (2, 8) is formed by means of a first end face (18) of a bushing (19) arranged around the first end (12) of the piston rod (11) and a shoulder (17) of the first end (12) of the piston rod (11), and wherein a second end face (20) of said bushing (19) abuts a stop element (21) arranged in the internal bore (14) of the first piston (2).

6. A brake or coupling system according to claim 1, wherein the effective piston area of the second piston (8) is smaller than the effective piston area of the first piston (2).

7. A brake or coupling system according to claim 1, wherein the relative movement between the first piston (2) and the second piston (8) is limited by means of a first end stop defining a first distance between the first and second pistons (2, 8) and a second end stop defining a second distance between the first and second pistons (2, 8).

8. A brake or coupling system according to claim 1, wherein the first and second piston cylinders (3, 9) are both formed in a stationary housing (4) of the brake or coupling system (1).

9. A brake or coupling system according to claim 1, wherein the first piston chamber (5') is in fluid communication with a first hydraulic fluid supply line (32'), and the valve system (24') is connected between the first piston chamber (5') and the second piston chamber (10'), wherein the valve system (24') is adapted to open a fluid connection between the first piston chamber (5') and the second piston chamber (10'), when pressure force is applied and hydraulic fluid is supplied to the first piston chamber (5') via the first hydraulic supply line (32'), and to close the fluid connection between the first piston chamber (5') and the second piston chamber (10'), when braking force is released.

10. A brake or coupling system according to claim 1, wherein the valve system (24') comprises a pilot valve.

11. A brake or coupling system according to claim 1, wherein a relief is connected to the second piston chamber (10, 10').

12. A method of operating a brake or coupling system (1), the system comprising a first piston (2) arranged displaceably in a first piston cylinder (3) thereby forming a first piston chamber (5) and a second piston (8) arranged displaceably in a second piston cylinder (9) thereby forming a second piston chamber (10), the first and second piston chambers (5, 10) connected to a supply of hydraulic fluid via a valve system (24'), the first and second pistons (2, 8) connected by means of a piston rod (11) wherein the first piston (2) is arranged at a first end (12) of the piston rod (11) and the second piston (8) is arranged at a second end (13) of the piston rod (11), the first piston (2) being adapted to be displaced between a braking position, in which braking force is applied between a friction element (6) and a rotatable element (7), and a rest position, in which the friction element (6) is spaced from the rotatable element (7), the first piston (2) being spring biased in the direction of its rest position by means of at least one spring element, the method comprising the following steps:
in order to apply a braking force between the friction element (6) and the rotatable element (7), displacing the first piston (2) from the rest position to the braking position by supplying hydraulic fluid to the first piston chamber (5), thereby biasing at least one spring element,
in order to release said braking force between the friction element (6) and the rotatable element (7), displacing the first piston (2) from the braking position to the rest position by allowing hydraulic fluid to leave the first piston chamber (5), thereby at least partially unbiasing the at least one spring element,
in order to adjust a distance provided between the friction element (6) and the rotatable element (7) in the rest position of the first piston, adjusting a volume of hydraulic fluid trapped in the second piston chamber (10),
characterized by that the at least one spring element is acting between the first and second pistons (2, 8), and by that, during application of said braking force, a hydraulic pressure in the first and second piston chambers (5, 10), respectively, urge the first and second pistons (2, 8) in opposite directions, thereby biasing the at least one spring element and wherein the valve system (24') is implemented into the piston rod.

13. The method of claim 12 wherein the at least one spring element is arranged in an internal bore (14) of the first piston.

14. The method of claim 12 wherein the first piston chamber (5') is in fluid communication with a first hydraulic fluid supply line (32'), and the valve system (24') is connected between the first piston chamber (5') and the second piston chamber (10'), wherein the valve system (24') is adapted to open a fluid connection between the first piston chamber (5') and the second piston chamber (10'), when pressure force is applied and hydraulic fluid is supplied to the first piston chamber (5') via the first hydraulic supply line (32'), and to close the fluid connection between the first piston chamber (5') and the second piston chamber (10'), when braking force is released.

15. The method of claim 12 wherein the valve system (24') comprises a pilot valve.

16. The method of claim 12 wherein a relief is connected to the second piston chamber (10').

17. A brake or coupling system (1) comprising a first piston (2) arranged displaceably in a first piston cylinder (3) thereby forming a first piston chamber (5) and a second piston (8) arranged displaceably in a second piston cylinder (9) thereby forming a second piston chamber (10), the first piston (2) being adapted to be displaced between a braking position, in which braking force is applied between a friction element (6) and a rotatable element (7), and a rest position, in which the friction element (6) is spaced from the rotatable element (7), the first piston (2) being spring biased in the direction of its rest position by means of at least one spring element, and the second piston (8) being adapted to adjust a distance (X) provided between the friction element (6) and the rotatable element (7) in the rest position of the first piston (2) by means of adjustment of a volume of hydraulic fluid trapped in the second piston chamber (10), characterized in that the at least one spring element is arranged to act between the first and second pistons (2, 8), and in that the first and second pistons (2, 8) are so arranged that a hydraulic pressure in the first and second piston chambers (5, 10), respectively, will urge the first and second pistons (2, 8) in opposite directions, thereby biasing the at least one spring element
wherein the first and second piston chambers (5, 10) are connected to a supply of hydraulic fluid via a valve system (24) adapted to, during application of braking force, supply hydraulic fluid to the first piston chamber (5) and allow leak of hydraulic fluid from the second piston chamber (10) and to, during release of braking force, allow hydraulic fluid to be drained from the first piston chamber (5) and close fluid connection to the second piston chamber (10) so that a volume of hydraulic fluid is trapped in the second piston chamber (10)
wherein the valve system (24) includes a check valve (25) provided with a first, a second and a third valve port (26, 27, 28), wherein the check valve (25) includes a valve element (29) that is spring biased against a valve seat (30) to normally prevent flow from the first valve port (26) to the second valve port (27) and to normally allow flow from the second valve port (27) to the first valve port (26) when a certain pressure drop occurs from the second valve port (27) to the first valve port (26), wherein the check valve (25) includes a pilot piston (31) arranged to be displaced by a hydraulic pressure applied to the third valve port (28) so that the pilot piston (31) engages the valve element (29) and brings it to its open position, wherein the first valve port (26) is in fluid communication with the second piston chamber (10), and wherein the second and third valve ports (27, 28) are in fluid communication with a first hydraulic fluid supply line (32) connecting the first piston chamber (5) with a first brake inlet port (33).

18. A brake or coupling system according to claim 17, wherein the first valve port (26) is in fluid communication with the second piston chamber (10) via a possibly adjustable flow restriction (34).

19. A brake or coupling system according to claim 17, wherein the second piston chamber (10) by means of a second hydraulic fluid supply line (36) is connected directly with a second brake inlet port (37).

20. A brake or coupling system (1) comprising a first piston (2) arranged displaceably in a first piston cylinder (3) thereby forming a first piston chamber (5) and a second piston (8) arranged displaceably in a second piston cylinder (9) thereby forming a second piston chamber (10), the first piston (2) being adapted to be displaced between a braking position, in which braking force is applied between a friction element (6) and a rotatable element (7), and a rest position, in which the friction element (6) is spaced from the rotatable element (7), the first piston (2) being spring biased in the direction of its rest position by means of at least one spring element, and the second piston (8) being adapted to adjust a distance (X) provided between the friction element (6) and the rotatable element (7) in the rest position of the first piston (2) by means of adjustment of a volume of hydraulic fluid trapped in the second piston chamber (10), characterized in that the at least one spring element is arranged to act between the first and second pistons (2, 8), and in that the first and second pistons (2, 8) are so arranged that a hydraulic pressure in the first and second piston chambers (5, 10), respectively, will urge the first and second pistons (2, 8) in opposite directions, thereby biasing the at least one spring element
wherein the first and second piston chambers (5, 10) are connected to a supply of hydraulic fluid via a valve system (24) adapted to, during application of braking force, supply hydraulic fluid to the first piston chamber (5) and allow leak of hydraulic fluid from the second piston chamber (10) and to, during release of braking force, allow hydraulic fluid to be drained from the first piston chamber (5) and close fluid connection to the second piston chamber (10) so that a volume of hydraulic fluid is trapped in the second piston chamber (10)
wherein the valve system (24) comprises a first electronically operated valve connecting the first piston chamber (5) with the supply of hydraulic fluid and a second electronically operated valve connecting the second piston chamber (10) with the supply of hydraulic fluid, and wherein the first and second electronically operated valves are controlled by means of a control system, such as a computer control system.

* * * * *